(12) United States Patent
Strongin, II et al.

(10) Patent No.: US 7,885,885 B1
(45) Date of Patent: Feb. 8, 2011

(54) SYSTEM AND METHOD FOR CREATING, MANAGING AND TRADING HEDGE PORTFOLIOS

(75) Inventors: Steven Harris Strongin, II, New York, NY (US); Lewis Segal, New York, NY (US); Ingrid Tierens, Jersey City, NJ (US)

(73) Assignee: Goldman Sachs & Co., New York, NY (US)

( * ) Notice: Subject to any disclaimer, the term of this patent is extended or adjusted under 35 U.S.C. 154(b) by 495 days.

(21) Appl. No.: 11/839,325

(22) Filed: Aug. 15, 2007

Related U.S. Application Data

(60) Provisional application No. 60/822,489, filed on Aug. 15, 2006.

(51) Int. Cl.
*G06Q 40/00* (2006.01)
(52) U.S. Cl. .......................... 705/36 R; 705/35; 705/37
(58) Field of Classification Search .............. 705/35–37
See application file for complete search history.

(56) References Cited

U.S. PATENT DOCUMENTS

| | | | | |
|---|---|---|---|---|
| 5,784,696 | A * | 7/1998 | Melnikoff | 705/36 R |
| 6,161,098 | A * | 12/2000 | Wallman | 705/36 T |
| 6,275,814 | B1 * | 8/2001 | Giansante et al. | 705/36 R |
| 6,278,981 | B1 * | 8/2001 | Dembo et al. | 705/36 R |
| 7,110,974 | B1 * | 9/2006 | Rust | 705/37 |
| 7,337,136 | B1 * | 2/2008 | Burns et al. | 705/36 R |
| 7,440,920 | B2 * | 10/2008 | Rust | 705/37 |
| 7,536,332 | B2 * | 5/2009 | Rhee | 705/36 R |

OTHER PUBLICATIONS

Jaksa Cvitanic, Ioannis Karatzas; "Hedging and Portfolio Optimization Under Transaction Costs: A Martingale Approach"; Oct. 1995; Mathematical Finance 6 (1996), p. 113-165.*
Jacek Gondzio, Roy Kouwenberg, Ton Vorst; "Hedging Options under Transaction Costs and Stochastic Volatility"; Jan. 31, 2000.*
Grannan, E R, & Swindle, G H. (1996). "Minimizing transaction costs of option hedging strategies"; Mathematical Finance, 6(4), 341; from ABI/INFORM Global. (Document ID: 10498538).*

* cited by examiner

*Primary Examiner*—Hani Kazimi
*Assistant Examiner*—Abhishek Vyas
(74) *Attorney, Agent, or Firm*—Chadbourne & Parke LLP; Walter G. Hanchuk

(57) ABSTRACT

The present invention discloses apparatuses, systems and methods for providing optimal hedge portfolios that minimize single stock idiosyncratic risk for a given level of transactional costs. This is accomplished by deriving hedge portfolios with the maximum effective n for various levels of transaction costs. In one exemplary embodiment the maximum effective n portfolios are derived by starting with a sample portfolio, such as a capital weighted index, and using a hill climbing algorithm to iteratively modify the sample portfolio to map out the optimal effective n portfolios.

25 Claims, 5 Drawing Sheets

SYSTEM AND METHOD FOR CREATING, MANAGING AND TRADING HEDGE PORTFOLIOS

RELATED APPLICATIONS

This application claims priority under 35 USC §119 for U.S. provisional application Ser. No. 60/822,489 filed Aug. 15, 2006. The entire contains of aforementioned application is hereby incorporated by reference.

FIELD OF THE INVENTION

The present invention is generally directed to apparatuses, methods and systems for investment securities trading. More specifically, the present invention discloses systems and methods for the creation of hedge portfolios to be used to manage risk for actively managed investment portfolios.

BACKGROUND OF THE INVENTION

Actively managed investment portfolios often employ hedging strategies against market risk in order to isolate and emphasize the stock selection skill of the portfolio managers. Typically, this is accomplished by hedging the actively managed portfolio against a capital weighted index, such as the S&P 500. This practice is based upon the assumption that the selected capital weighted index accurately tracks common market risk. In other words, the index does not contain any significant single stock idiosyncratic risk. Consistent with these assumptions, the hedge ratio for a particular actively managed investment portfolio/capital weighted index combination is determined by performing a linear regression of the investment portfolio against the capital weighted index.

SUMMARY OF THE INVENTION

The present invention provides systems, methods and apparatuses for developing optimal hedge portfolios that minimize single stock idiosyncratic risk for a given level of transactional costs. This is accomplished by deriving hedge portfolios with the maximum effective n for various levels of transaction costs. In one exemplary embodiment the maximum effective n portfolios are derived by starting with a sample portfolio, such as a capital weighted index, and using a hill climbing algorithm to iteratively modify the sample portfolio to map out the optimal effective n portfolios.

With the optimal hedge portfolio defined for a particular investor, a regression, such as an orthogonal regression, is performed between the investor's actively traded portfolio and the optimal hedge. This regression is used to determine the appropriate hedge ratio for the investor's actively traded portfolio.

An optimal hedge trading system is disclosed to create, trade and manage the optimal hedges disclosed. The system interacts with the investors and the markets to determine optimal hedge portfolios, match those portfolios with the needs of the investor, calculate the appropriate hedge ratio based on the investor's actively traded portfolio, acquire the optimal hedge portfolio from the markets, and manage and maintain the optimal hedge portfolio after acquisition.

BRIEF DESCRIPTION OF THE DRAWINGS

The accompanying appendices and/or drawings illustrate various non-limiting, representative, inventive aspects in accordance with the present disclosure.

Figure 1:
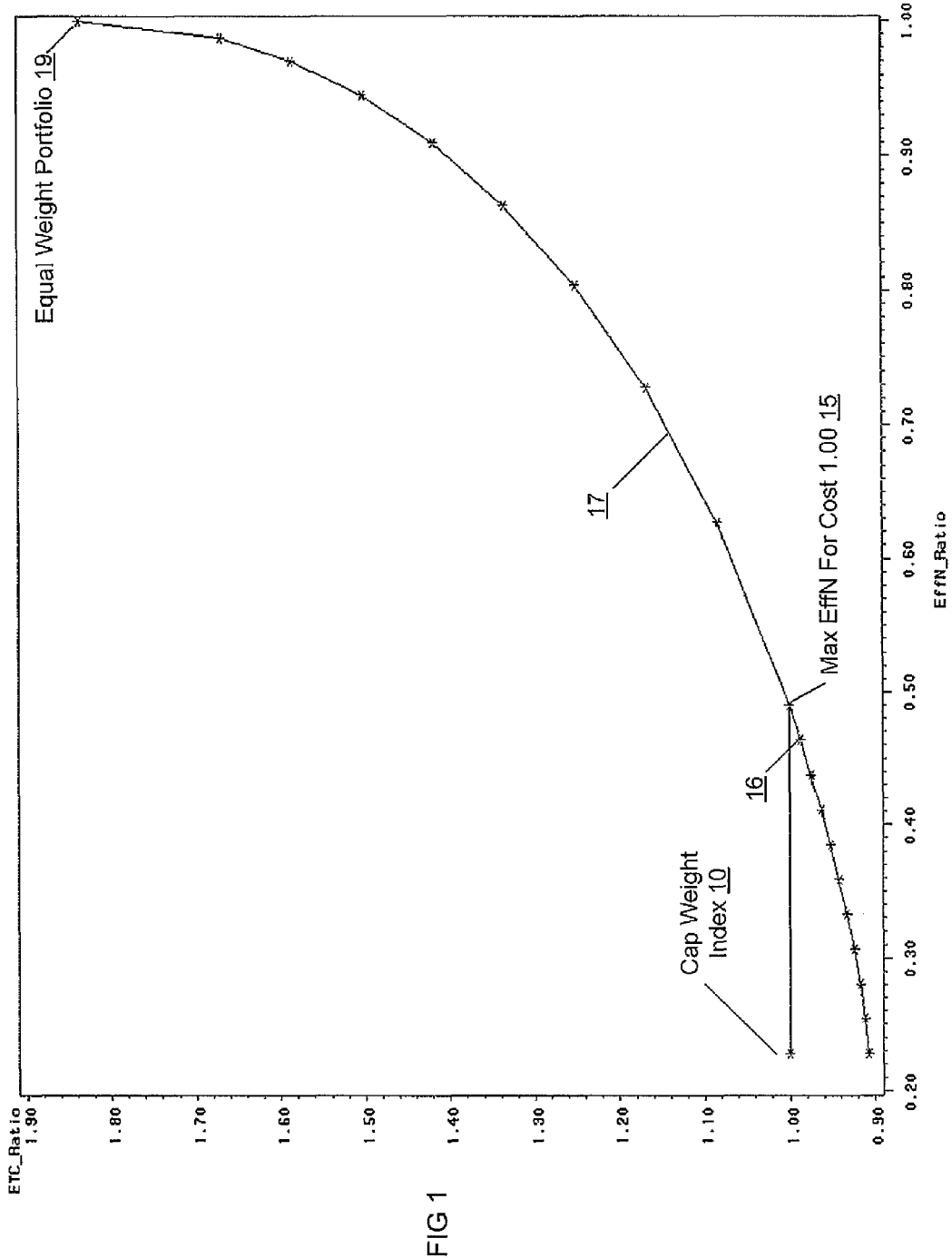
FIG. 1 is a graph demonstrating optimal hedge portfolios in accordance with an embodiment of the present invention.

The leading number of each reference numeral indicates the first drawing in which that reference numeral is introduced. For example, step 220 is first introduced in FIG. 2.

DETAILED DESCRIPTION

Hedges against capital weighted indices do not accurately account for common market risk because the indices are subject to price fluctuations due to the idiosyncratic behavior of the indices' highly weighted securities. Essentially, the largest holdings in the capital weighted indices are a significant enough percentage of the whole that variability in highest weighted stocks will move the entire index. Thus, a hedge based on a capital weighted index will not accurately reflect common market risks because a significant portion of the index's value will be based on the performance of the highly weighted holdings. Accordingly, a hedge based on a capital weighted index will not accurately represent the investment selection abilities of the investment portfolio managers. This problem is most pronounced when investments are concentrated in a particular sector because there is a relatively smaller universe of total stocks and the large entities tend to take up significantly greater portions of the sector index.

The present invention discloses the creation, management and trading of hedge portfolios that accurately track common market risk and minimize single stock idiosyncratic risk relative to trading costs. The level of stock-specific risks in a portfolio is quantified as the effective n, ñ, of the portfolio. The effective n of a portfolio is defined as the number securities in an equal-weighted portfolio with the same level of stock specific risk as the portfolio being characterized. For example, while the S&P 500 consists of 500 stocks, its effective n might only be 115, which would indicate that the S&P 500 is only as diverse as a 115 stock equally weighted portfolio. The effective n of a portfolio is computed as follows:

$$\tilde{n} = \frac{1}{\sum_{i=1}^{n} w_i^2},$$

where $w_i$ equals the weight of each stock in the portfolio and n is the number of stocks in the portfolio. This leads to a maximum possible effective n, ñ, of n, which would represent an equal weighted portfolio.

Equal weighted portfolios minimize single stock idiosyncratic risk because each stock contributes equally to the portfolio's performance. Thus, overall portfolio volatility is simply dependent on the number of securities in the portfolio. The volatility of the portfolio decreases at a rate roughly inverse to the square root of the number of securities in the portfolio, $$n, \left(\frac{1}{\sqrt{n}}\right).$$

Thus, an equal weighted hedge portfolio with a high n will provide protection against volatility due to single stock idiosyncratic risk and track common market movements. Large n equal weighted hedge portfolios, however, are expensive due to high trading costs.

The trading costs associated with a given hedge portfolio are the sum of the trading costs for the individual securities that make up the portfolio. The trading costs for a given security associated with large portfolio can be determined based upon a base transactional cost, the average percentage change in intra-day price, the average basis point spread over the life of the purchase order and the size of the order relative to the expected market volume over order life. One exemplary equation for expected trading costs (ETC) is as follows:

$$ETC = \beta_1 + \beta_2 \sigma + \beta_3 D + \frac{\beta_4}{\beta_5}\left[\left(\frac{S}{V^\gamma}\right)^{\beta_5} - 1\right];$$

where $\beta_1$ is a base trading cost; $\beta_2$ is a volatility coefficient; $\sigma$ is the average percentage intra-day price range; $\beta_3$ is coefficient relating to the size of the order; D is the average basis point spread over the life of the order; $\beta_4$, $\beta_5$ and $\gamma$ are coefficients that relate order size to market volume; S is the order size and V is the expected market volume over order life.

Trading costs can also be measured as the execution shortfall. For buy order the execution shortfall can be defined as the execution price minus the prevailing midquote when the trader received order (strike price) as a percentage of strike price, in basis points. For sell orders, execution shortfall is the strike price minus execution price as a percentage of strike price.

A t-cost model, such as the Goldman Sachs U.S. t-cost model, can provide pre-trade estimates of an order's execution shortfall. The model consists of non-linear regression of execution shortfall on seven factors: (1) Order size ($ value); (2) Intra-day execution horizon (e.g. 9:30 to 12:30); (3) Market capitalization of stock (large-cap>$7.5 billion, mid-cap, small-cap<$1 billion); (4) Listing venue of stock (e.g. NYSE); (5) Average bid-ask quoted spread of stock (in basis points) over execution horizon; (6) Average trading volume ($) over trading horizon; (7) Average price volatility of stock (intra-day price range % of average price). In one particular embodiment, the model is re-estimated monthly with rolling nine months using a large sample of actual orders executed over the sample period, such as actual Goldman Sachs all-day and intra-day market orders executed over the sample period. The cost estimates, therefore, reflect how much it actually cost to execute similar orders in the past, as opposed to providing a "hypothetical cost" derived using tick data and a theoretical model of trading. The cost estimates reflect the average trading alpha (or information content) of the orders in the estimation sample.

To generate cost estimates using the model the average bid-ask spreads, trading volume, and volatility are used over a daily rolling window of the past 21 days. As these averages change over time the cost estimates reflect these changes. The cost estimates depend on both the execution horizon and the time-of-day the execution begins, e.g., an order entered at 9:30 with a two-hour execution horizon will have a different cost estimate than the same order with a six-hour horizon because the six-hour order will interact with a greater volume. Also, because of the intraday volume and bid-ask spread patterns identical two-hour orders entered at 9:30 and 12:00 will have different trading cost estimates. The model, therefore, can be used to analyze how the size, timing and aggressiveness of an execution influence trading costs. In one embodiment, the accuracy of the cost model will be determined by the sample data set. For example, if the sample data set has relatively few intra-day orders above 25% of ADV, estimates will become increasingly unreliable for order sizes above 25%, likely leading to an underestimation of the expected cost. In such an embodiment, one might avoid using the model for order sizes above 50% because it will lack sufficient accuracy.

FIG. 1 is a graph showing the relationship of trading costs to effective n for different hedge portfolios, for a particular trading sector. The y axis represents the expected cost of the portfolio as a ratio compared to the cost of a capital weighted index for that sector. The x axis represents the effective n as a ratio compared to n, the total universe of stocks for that sector. The point representing the capital weighted index for this sector 10 shows that it has an effective n that is approximately 23% of the effective n of a equal weighted portfolio of the stocks in that sector. Point 19 represents the maximum attainable effective n, which would represent an equally weighted portfolio of all the stocks in the relevant universe. The expected trading cost of the capital weighted index 10 is 1.00, which is as expected because the capital weighted index was used as the benchmark for the cost axis. Optimal hedge portfolio curve 17 represents portfolios with the optimal ratio of cost to effective n achievable for this sector. As shown by the horizontal line leading from point 10 to point 15, point 15 represents the portfolio having the maximum effective n for the same cost as the capital weighted index. In this example, an optimal portfolio produced according to the disclosed system and with the same transactional costs of the capital weighted index, would have an effective n that is approximately 49% of the effective n of an equal weighted portfolio of all the stocks in the sector. This is approximately a two fold improvement over the effective n of capital weighted index.

As noted above, the points on the optimal hedge portfolio curve 17 represent portfolios with optimal effective n for the given trading costs. Generating the optimal hedge portfolio curve 17 can be accomplished in a number of ways. In one embodiment, the transactional costs and effective n can be computed for every possible portfolio combination. This brute force solution will create optimal hedge portfolio curve 17, but will be relatively computationally expensive.

One optimization of the brute force technique would start with a given portfolio and then use numerical techniques to optimize the portfolio. For example, by iteratively altering portfolio parameters, such as varying the securities that make up the portfolio and/or their relative weights in the portfolio, variations that improve cost or effective n can be kept and further modified until the optimal portfolio is reached after a number of iterations. The iterations continue until you cannot increase or decrease stock weights without violating the trading cost restriction. Various hill climbing algorithms can accomplish this type of optimization. Because the problem of solving for the optimal effective n versus transactional cost portfolio has a global maximum, the optimization will be bounded and a final result will ultimately be reached. In a variation of this embodiment, the optimization routine might be limited to a certain number of iterations or a certain amount of computation time, which would limit the amount of computational resources used but may result in an estimate of the true optimal hedge portfolio curve 17.

Another method for optimizing the generation of the optimal hedge portfolio curve 17 is to exclude from the universe of eligible securities any securities with excessively expensive trading costs. Certain securities will be expensive to trade because, for example, there is little liquidity or trading volume in the market for the security. Eliminating these hard to borrow, expensive and restricted securities will likely shorten the portfolio generation process it is unlikely that these stocks will be present in the optimal hedge portfolios at a given cost.

Another technique for optimizing the generation of the optimal hedge curve is the realization that, for a given portfolio, weights greater than $$\left(\frac{2}{\tilde{n}+1}\right)$$

for an individual stock increase stock specific risk. Accordingly, reducing the weights of any such stocks in a portfolio should increase the effective n.

Figure 2:
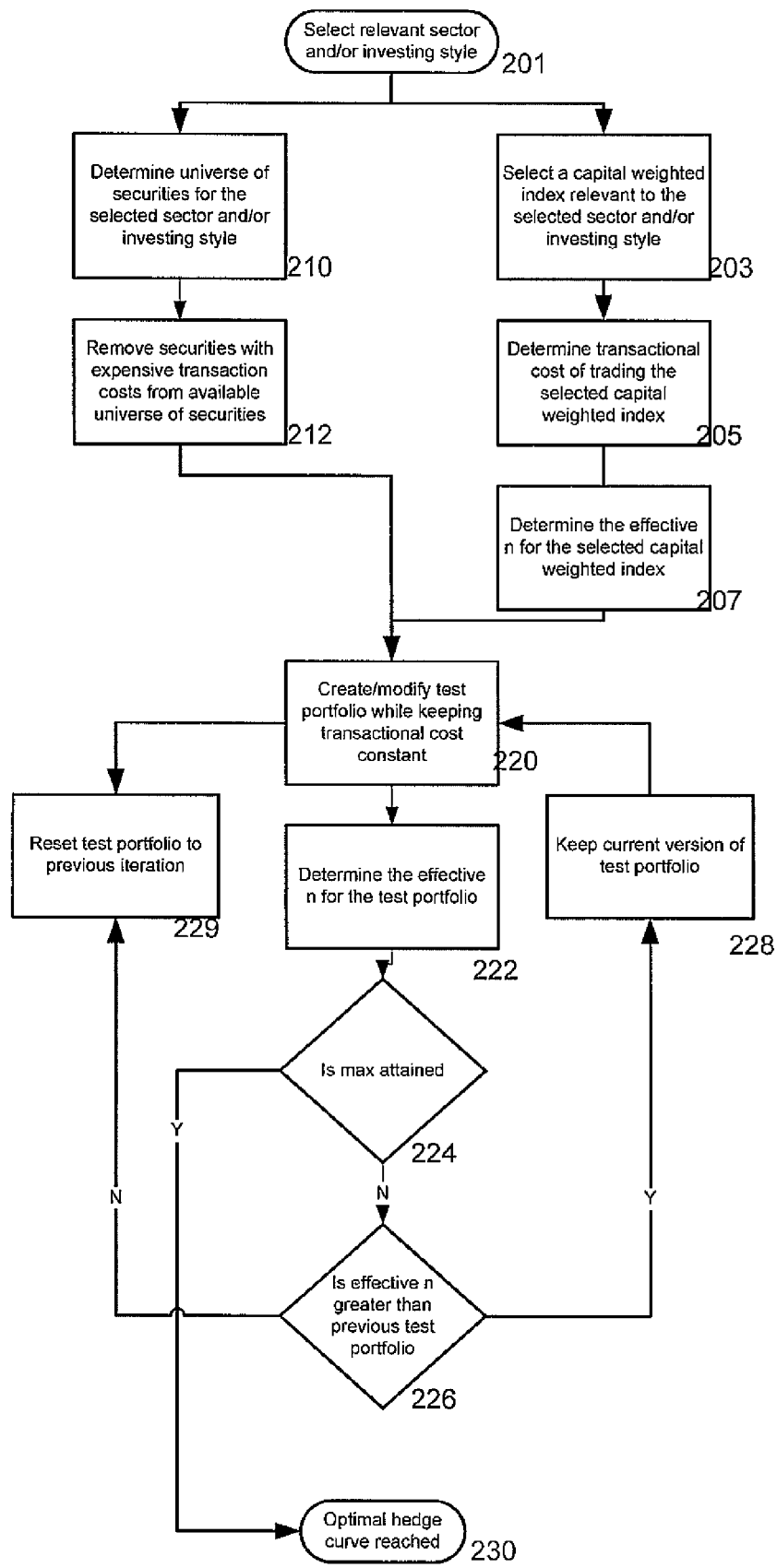
FIG. 2 is a flow diagram showing optimal hedge portfolio generation in accordance with an embodiment of the present invention.

FIG. 2 shows a flow diagram of one exemplary process used to derive the optimal hedge portfolio curve 17. Variations on this process could be made by adding or subtracting the optimization techniques discussed above or by changing the order of the disclosed steps. To begin, the appropriate sector, such as technology or energy, and/or the appropriate investing style, such as growth, value, small cap or large cap, is selected 201. A capital weighted index in the relevant sector/style is selected as a starting point 203. Next, the transactional costs associated with the capital weighted index are computed 205. The effective n for the capital weighted index is also computed 207. In addition, the universe of securities for the relevant sector/style is determined 210 and securities with excessive trading costs are removed from the universe 212. In step 220 the capital weighted index is modified to create a test portfolio with any to the excessive trading cost securities identified in step 212 removed, other securities from the available universe of securities may be added and/or the relative weight of the securities may be altered, such that the total transactional costs of the test portfolio are equal to the transactional costs of the capital weighted portfolio. The effective n of the test portfolio is calculated 222. Next, a determination is made whether the max effective n for the given level of transactional costs has been reached 224. If it has, the optimal hedge portfolio curve 17 has been reached 230. If not, a determination is made whether the effective n has increased 226. If the effective n has increased, this test portfolio is kept 228 and then slightly modified in a return to step 220. If the step 226 determination shows that the effective n of the test portfolio has not increased, the current test portfolio is discarded and the previous test portfolio is used 229 as the basis for the next modification and test iteration in a return to step 220. Over a number of iterations the effective n of the portfolio will increase until the max effective n for that cost is reached and step 224 returns a pass to 230. The portfolio providing the max effective n for that level of transaction costs can be recorded 230.

Other portfolios fitting the optimal hedge portfolio curve 17 can be determined by repeating the iterative loop from step 220, but changing the transactional costs to a different value. For example, reducing the transactional costs 2% and re-running the iterative loop will output the portfolio at point 16 in FIG. 1. This process can be repeated for different transactional cost to move up and down the optimal hedge portfolio curve 17.

Figure 3A:
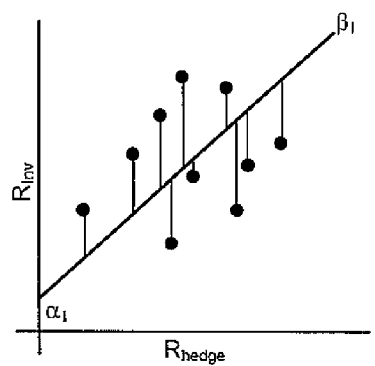
FIGS. 3*a-d* are graphs showing regressions in accordance with embodiments of the present invention.
Figure 3B:
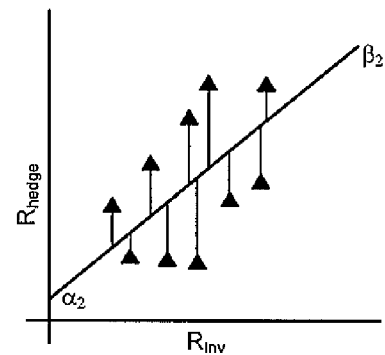
Figure 3C:
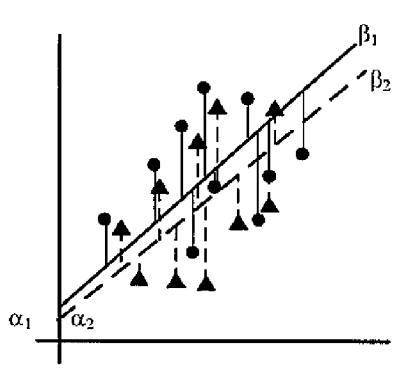

The above disclosed methods enable the creation of an optimal hedge portfolio. In a further embodiment, the optimal hedge is used as the basis for a regression of the investment portfolio to determine a hedge ratio for the optimal hedge investment. As shown in FIG. 3a, the investment portfolio is linearly regressed against the hedge portfolio to create a regression line $(R_{Inv})=\alpha_2+\beta_1(R_{hedge})+error_1$. The points on the graph represent the relative returns of the hedge portfolio and the investment portfolio at particular times. As shown, the linear regression only considers the y axis variance of the investment portfolio relative to the hedge portfolio. As shown in FIG. 3b, if a regression were performed such that the hedge was linearly regressed against the investment portfolio, in would result in a regression line $R_{hedge}=\alpha_2+\beta_2(R_{Inv})+error_2$. Simple linear regression is used to calculate hedge ratios based on the assumption that $\beta_1=\beta_2$, which is in fact generally not the case. As is shown in FIG. 3c, the regression performed for the investment return against the hedge return is not equal to the regression performed for the hedge return against the investment return.

Figure 3D:
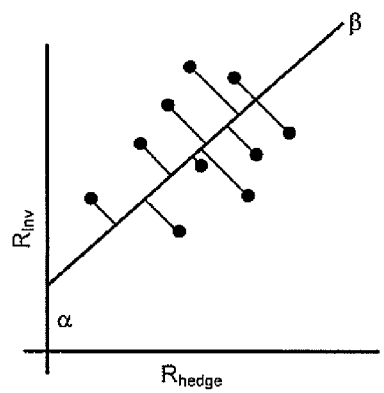

An alternate method of computing hedge ratio, as shown in FIG. 3d, is to take the symmetric or orthogonal regression (also known as errors in variables regression) of the investment portfolio to the hedge portfolio. As shown in FIG. 3d, this method determines the orthogonal variance of the data points to the line $(R_{Inv})=\alpha+\beta(R_{hedge})+error$. This method recognizes that the hedge portfolio is not precisely equivalent to the market and the regression more accurately reflects idiosyncratic risk from both the investment portfolio and the hedge portfolio.

Figure 4:
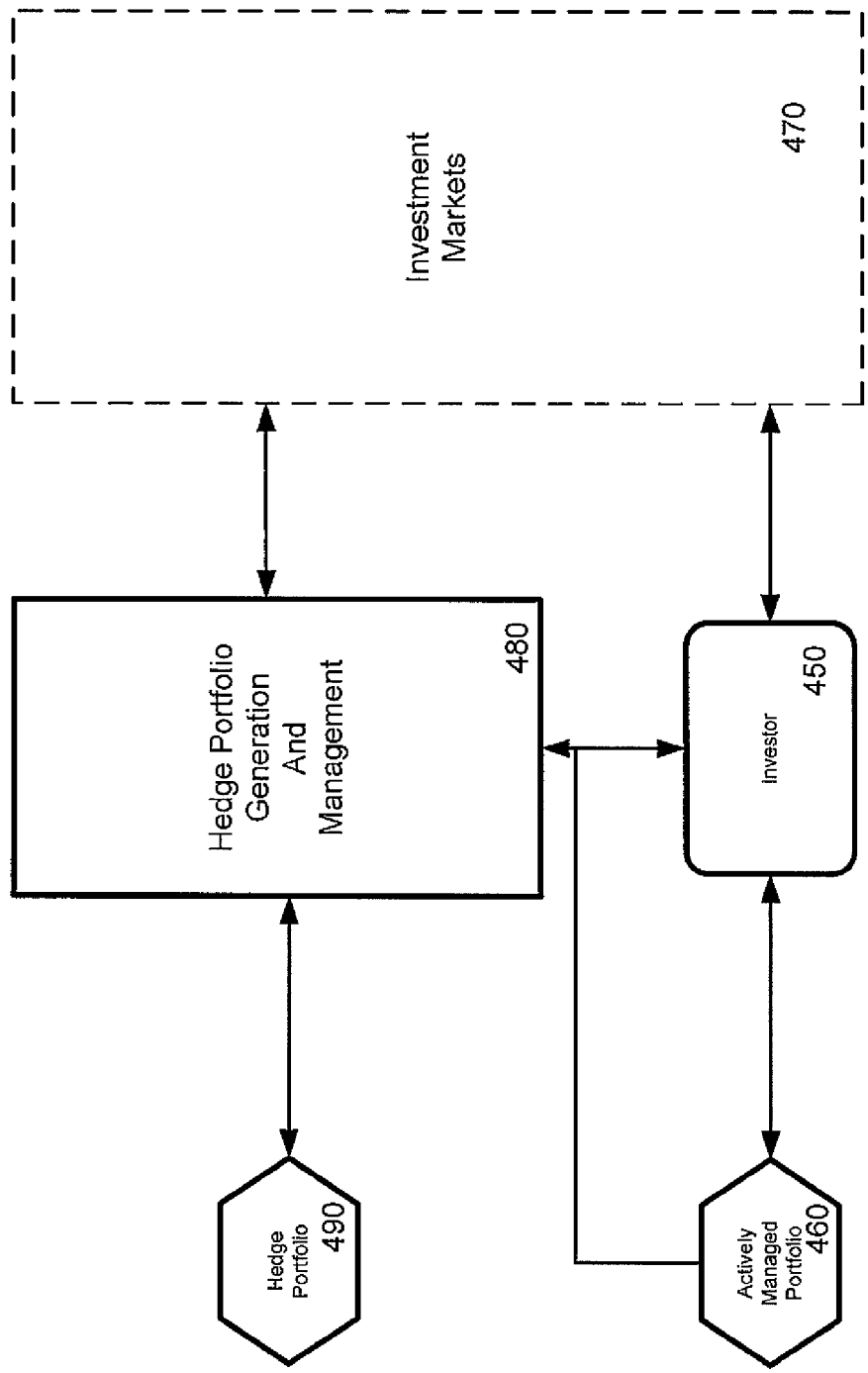
FIG. 4 discloses a optimal hedge generation and trading system in accordance with one embodiment of the present invention.

FIG. 4 shows a exemplary embodiment of a trading system implementing the methods previously discussed. In the system an investor 450 creates an investment portfolio 460 by trading in one or more investment markets 470. The investor consults with the hedge portfolio generation and management processor 480, see FIG. 5 discussion below, to develop an optimal hedge for the investor's actively traded investment portfolio 460. In order to develop the appropriate hedge the composition of the investment portfolio 460 is communicated to the hedge portfolio generation and management processor 480. The hedge portfolio generation and management processor 480, determines the investment style and/or sector either by examining the investment portfolio or querying the investor 450, and uses that information to determine the optimal hedge portfolio, as discussed above. A regression between the optimal hedge and the investment portfolio is performed and an appropriate hedge ratio is computed. This process may entail further investor queries to determine the amount of hedge desired. The hedge portfolio generation and management processor 480 then acquires the securities representing the hedge through transactions in the investment markets 470. For example, the hedge portfolio can be implemented at the stock level via program trade, swap or option combo. The result is the investor's hedge portfolio 490. The hedge portfolio generation and management processor 480 may further perform other beneficial hedge services, such as periodic rebalancing of the hedge portfolio 490. The operation and management processor may also facilitate corporate actions, the elimination of hard to borrows, moves in/out of industries, and changes in industry classifications.

Hedge Portfolio Generation and Management Controller

Figure 5:
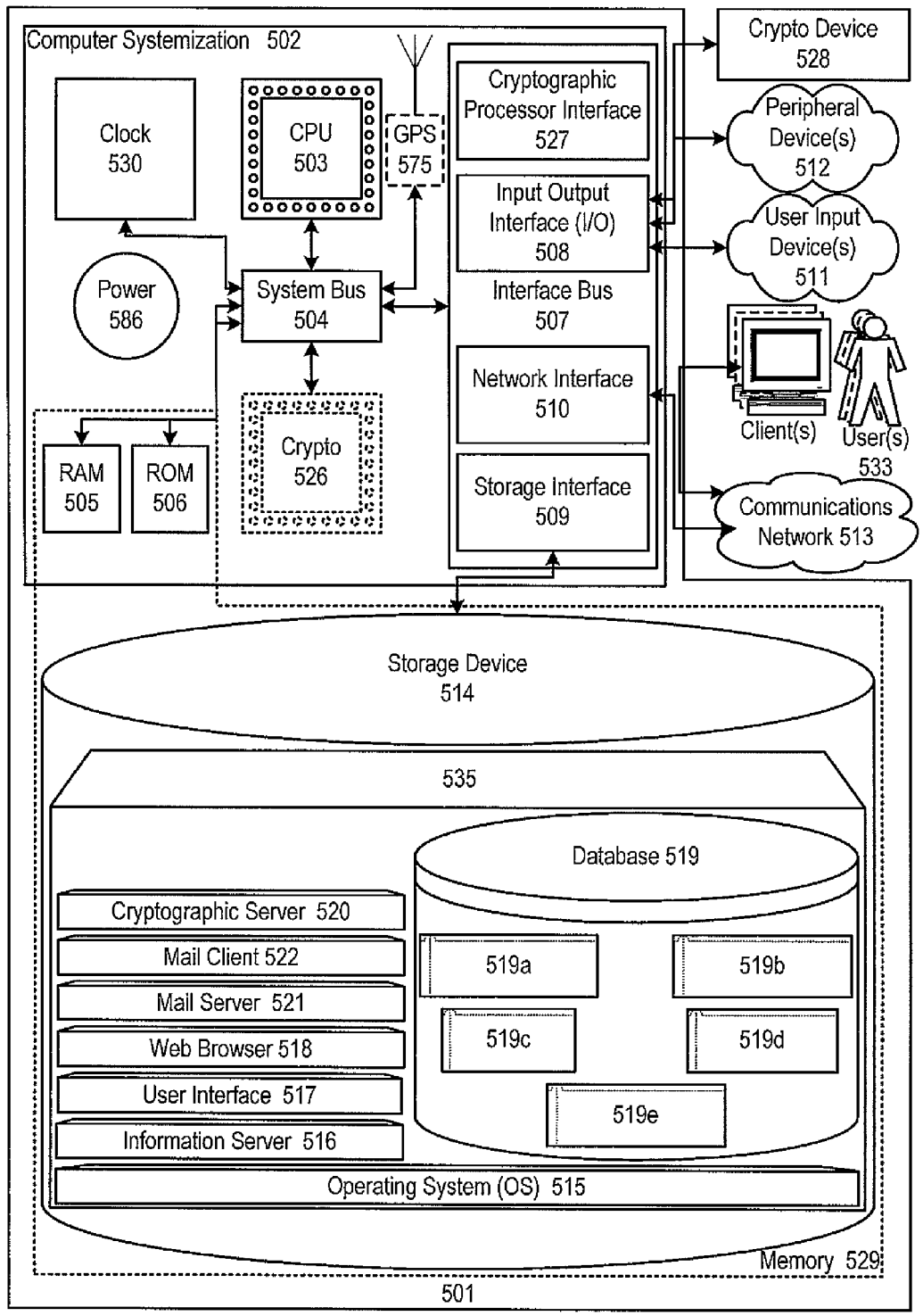
FIG. 5 discloses a computer systemization disclosing aspects of embodiments of the present invention.

FIG. 5 of the present disclosure illustrates inventive aspects of a hedge portfolio generation and management controller

501 in a block diagram. In this embodiment, the hedge portfolio generation and management controller 501 may serve to generate manage and trade optimal hedge portfolios.

Typically, users, which may be people and/or other systems, engage information technology systems (e.g., commonly computers) to facilitate information processing. In turn, computers employ processors to process information; such processors are often referred to as central processing units (CPU). A common form of processor is referred to as a microprocessor. A computer operating system, which, typically, is software executed by CPU on a computer, enables and facilitates users to access and operate computer information technology and resources. Common resources employed in information technology systems include: input and output mechanisms through which data may pass into and out of a computer; memory storage into which data may be saved; and processors by which information may be processed. Often information technology systems are used to collect data for later retrieval, analysis, and manipulation, commonly, which is facilitated through database software. Information technology systems provide interfaces that allow users to access and operate various system components.

In one embodiment, the hedge portfolio generation and management controller 501 may be connected to and/or communicate with entities such as, but not limited to: one or more users from user input devices 511; peripheral devices 512; and/or a communications network 513.

Networks are commonly thought to comprise the interconnection and interoperation of clients, servers, and intermediary nodes in a graph topology. It should be noted that the term "server" as used throughout this disclosure refers generally to a computer, other device, software, or combination thereof that processes and responds to the requests of remote users across a communications network. Servers serve their information to requesting "clients." The term "client" as used herein refers generally to a computer, other device, software, or combination thereof that is capable of processing and making requests and obtaining and processing any responses from servers across a communications network. A computer, other device, software, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The hedge portfolio generation and management controller 501 may be based on common computer systems that may comprise, but are not limited to, components such as: a computer systemization 502 connected to memory 529.

Computer Systemization

A computer systemization 502 may comprise a clock 530, central processing unit (CPU) 503, a read only memory (ROM) 506, a random access memory (RAM) 505, and/or an interface bus 507, and most frequently, although not necessarily, are all interconnected and/or communicating through a system bus 504. Optionally, the computer systemization may be connected to an internal power source 586. Optionally, a cryptographic processor 526 may be connected to the system bus. The system clock typically has a crystal oscillator and provides a base signal. The clock is typically coupled to the system bus and various clock multipliers that will increase or decrease the base operating frequency for other components interconnected in the computer systemization. The clock and various components in a computer systemization drive signals embodying information throughout the system. Such transmission and reception of signals embodying information throughout a computer systemization may be commonly referred to as communications. These communicative signals may further be transmitted, received, and the cause of return and/or reply signal communications beyond the instant computer systemization to: communications networks, input devices, other computer systemizations, peripheral devices, and/or the like. Of course, any of the above components may be connected directly to one another, connected to the CPU, and/or organized in numerous variations employed as exemplified by various computer systems.

The CPU comprises at least one high-speed data processor adequate to execute program modules for executing user and/or system-generated requests. The CPU may be a microprocessor such as AMD's Athlon, Duron and/or Opteron; IBM and/or Motorola's PowerPC; Intel's Celeron, Itanium, Pentium, Xeon, Core and/or XScale; and/or the like processor(s). The CPU interacts with memory through signal passing through conductive conduits to execute stored program code according to conventional data processing techniques. Such signal passing facilitates communication within the hedge portfolio generation and management controller and beyond through various interfaces. Should processing requirements dictate a greater amount speed, parallel, mainframe and/or super-computer architectures may similarly be employed. Alternatively, should deployment requirements dictate greater portability, smaller Personal Digital Assistants (PDAs) may be employed.

Power Source

The power source 586 may be of any standard form for powering small electronic circuit board devices such as the following power cells: alkaline, lithium hydride, lithium ion, nickel cadmium, solar cells, and/or the like. Other types of AC or DC power sources may be used as well. In the case of solar cells, in one embodiment, the case provides an aperture through which the solar cell may capture photonic energy. The power cell 586 is connected to at least one of the interconnected subsequent components of the hedge portfolio generation and management controller thereby providing an electric current to all subsequent components. In one example, the power source 586 is connected to the system bus component 504. In an alternative embodiment, an outside power source 586 is provided through a connection across the I/O 508 interface. For example, a USB and/or IEEE 1394 connection carries both data and power across the connection and is therefore a suitable source of power.

Interface Adapters

Interface bus(ses) 507 may accept, connect, and/or communicate to a number of interface adapters, conventionally although not necessarily in the form of adapter cards, such as but not limited to: input output interfaces (I/O) 508, storage interfaces 509, network interfaces 510, and/or the like. Optionally, cryptographic processor interfaces 527 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended)

Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 509 may accept, communicate, and/or connect to a number of storage devices such as, but not limited to: storage devices 514, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 510 may accept, communicate, and/or connect to a communications network 513. Through a communications network 513, the hedge portfolio generation and management controller is accessible through remote clients 533b (e.g., computers with web browsers) by users 533a. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 510 may be used to engage with various communications network types 513. For example, multiple network interfaces may be employed to allow for the communication over broadcast, multicast, and/or unicast networks.

Input Output interfaces (I/O) 508 may accept, communicate, and/or connect to user input devices 511, peripheral devices 512, cryptographic processor devices 528, and/or the like. I/O may employ connection protocols such as, but not limited to: Apple Desktop Bus (ADB); Apple Desktop Connector (ADC); audio: analog, digital, monaural, RCA, stereo, and/or the like; IEEE 1394a-b; infrared; joystick; keyboard; midi; optical; PC AT; PS/2; parallel; radio; serial; USB; video interface: BNC, coaxial, composite, digital, Digital Visual Interface (DVI), RCA, RF antennae, S-Video, VGA, and/or the like; wireless; and/or the like. A common output device is a television set, which accepts signals from a video interface. Also, a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Typically, the video interface provides the composited video information through a video connection interface that accepts a video display interface (e.g., an RCA composite video connector accepting an RCA composite video cable; a DVI connector accepting a DVI display cable, etc.).

User input devices 511 may be card readers, dongles, finger print readers, gloves, graphics tablets, joysticks, keyboards, mouse (mice), remote controls, retina readers, trackballs, trackpads, and/or the like.

Peripheral devices 512 may be connected and/or communicate to I/O and/or other facilities of the like such as network interfaces, storage interfaces, and/or the like. Peripheral devices may be audio devices, cameras, dongles (e.g., for copy protection, ensuring secure transactions with a digital signature, and/or the like), external processors (for added functionality), goggles, microphones, monitors, network interfaces, printers, scanners, storage devices, video devices, video sources, visors, and/or the like.

It should be noted that although user input devices and peripheral devices may be employed, the hedge portfolio generation and management controller may be embodied as an embedded, dedicated, and/or monitor-less (i.e., headless) device, wherein access would be provided over a network interface connection.

Memory

Generally, any mechanization and/or embodiment allowing a processor to affect the storage and/or retrieval of information is regarded as memory 529. However, memory is a fungible technology and resource, thus, any number of memory embodiments may be employed in lieu of or in concert with one another. It is to be understood that the hedge portfolio generation and management controller and/or a computer systemization may employ various forms of memory 529. For example, a computer systemization may be configured wherein the functionality of on-chip CPU memory (e.g., registers), RAM, ROM, and any other storage devices are provided by a paper punch tape or paper punch card mechanism; of course such an embodiment would result in an extremely slow rate of operation. In a typical configuration, memory 529 will include ROM 506, RAM 505, and a storage device 514. A storage device 514 may be any conventional computer system storage. Storage devices may include a drum; a (fixed and/or removable) magnetic disk drive; a magneto-optical drive; an optical drive (i.e., CD ROM/RAM/Recordable (R), ReWritable (RW), DVD R/RW, etc.); and/or other devices of the like. Thus, a computer systemization generally requires and makes use of memory.

Module Collection

The memory 529 may contain a collection of program and/or database modules and/or data such as, but not limited to: operating system module(s) 515 (operating system); information server module(s) 516 (information server); user interface module(s) 517 (user interface); Web browser module(s) 518 (Web browser); database(s) 519; cryptographic server module(s) 520 (cryptographic server); the hedge portfolio generation and management module(s) 535; and/or the like (i.e., collectively a module collection). These modules may be stored and accessed from the storage devices and/or from storage devices accessible through an interface bus. Although non-conventional software modules such as those in the module collection, typically, are stored in a local storage device 514, they may also be loaded and/or stored in memory such as: peripheral devices, RAM, remote storage facilities through a communications network, ROM, various forms of memory, and/or the like.

Operating System

The operating system module 515 is executable program code facilitating the operation of the hedge portfolio generation and management controller. Typically, the operating system facilitates access of I/O, network interfaces, peripheral devices, storage devices, and/or the like. The operating system may be a highly fault tolerant, scalable, and secure system such as Apple Macintosh OS X (Server), AT&T Plan 9, Be OS, Linux, Unix, and/or the like operating systems. However, more limited and/or less secure operating systems also may be employed such as Apple Macintosh OS, Microsoft DOS, Palm OS, Windows 2000/2003/3.1/95/98/CE/Millenium/NT/XP (Server), and/or the like. An operating system may communicate to and/or with other modules in a module collection, including itself, and/or the like. Most frequently, the operating system communicates with other program modules, user interfaces, and/or the like. For example, the operating system may contain, communicate, generate, obtain, and/or provide program module, system, user, and/or data communications, requests, and/or responses. The operating system, once executed by the CPU, may enable the interaction with communications networks, data, I/O, peripheral devices, program modules, memory, user input devices, and/or the like. The operating system may provide communications protocols that allow the hedge portfolio generation and management controller to communicate with other entities through a communications network 513. Various communication protocols may be used by the hedge portfolio generation and management controller as a subcarrier transport mechanism for interaction, such as, but not limited to: multicast, TCP/IP, UDP, unicast, and/or the like.

Information Server

An information server module 516 is stored program code that is executed by the CPU. The information server may be a conventional Internet information server such as, but not limited to Apache Software Foundation's Apache, Microsoft's Internet Information Server, and/or the. The information server may allow for the execution of program modules through facilities such as Active Server Page (ASP), ActiveX, (ANSI) (Objective-) C (++), C2, Common Gateway Interface (CGI) scripts, Java, JavaScript, Practical Extraction Report Language (PERL), Python, WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), and/or the like. The information server provides results in the form of Web pages to Web browsers, and allows for the manipulated generation of the Web pages through interaction with other program modules. After a Domain Name System (DNS) resolution portion of an HTTP request is resolved to a particular information server, the information server resolves requests for information at specified locations on the hedge portfolio generation and management controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other modules in a module collection, including itself, and/or facilities of the like. Most frequently, the information server communicates with the hedge portfolio generation and management controller, operating systems, other program modules, user interfaces, Web browsers, and/or the like.

Also, an information server may contain, communicate, generate, obtain, and/or provide program module, system, user, and/or data communications, requests, and/or responses.

User Interface

The function of computer interfaces in some respects is similar to automobile operation interfaces. Automobile operation interface elements such as steering wheels, gearshifts, and speedometers facilitate the access, operation, and display of automobile resources, functionality, and status. Computer interaction interface elements such as check boxes, cursors, menus, scrollers, and windows (collectively and commonly referred to as widgets) similarly facilitate the access, operation, and display of data and computer hardware and operating system resources, functionality, and status. Operation interfaces are commonly called user interfaces. Graphical user interfaces (GUIs) such as the Apple Macintosh Operating System's Aqua, Microsoft's Windows XP, or Unix's X-Windows provide a baseline and means of accessing and displaying information graphically to users.

A user interface module 517 is stored program code that is executed by the CPU. The user interface may be a conventional graphic user interface as provided by, with, and/or atop operating systems and/or operating environments such as Apple Macintosh OS, e.g., Aqua, Microsoft Windows (NT/XP), Unix X Windows (KDE, Gnome, and/or the like), mythTV, and/or the like. The user interface may allow for the display, execution, interaction, manipulation, and/or operation of program modules and/or system facilities through textual and/or graphical facilities. The user interface provides a facility through which users may affect, interact, and/or operate a computer system. A user interface may communicate to and/or with other modules in a module collection, including itself, and/or facilities of the like. Most frequently, the user interface communicates with operating systems, other program modules, and/or the like. The user interface may contain, communicate, generate, obtain, and/or provide program module, system, user, and/or data communications, requests, and/or responses.

Web Browser

A Web browser module 518 is stored program code that is executed by the CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Some Web browsers allow for the execution of program modules through facilities such as Java, JavaScript, ActiveX, and/or the like. Web browsers and like information access tools may be integrated into PDAs, cellular telephones, and/or other mobile devices. A Web browser may communicate to and/or with other modules in a module collection, including itself, and/or facilities of the like. Most frequently, the Web browser communicates with information servers, operating systems, integrated program modules (e.g., plug-ins), and/or the like; e.g., it may contain, communicate, generate, obtain, and/or provide program module, system, user, and/or data communications, requests, and/or responses. Of course, in place of a Web browser and information server, a combined application may be developed to perform similar functions of both. The combined application would similarly affect the obtaining and the provision of information to users, user agents, and/or the like from the hedge portfolio generation and management controller enabled nodes. The combined application may be nugatory on systems employing standard Web browsers.

Hedge Portfolio Generation and Management Controller Module

The hedge portfolio generation and management controller module 535 Is Stored program code that is executed by the CPU. The hedge portfolio generation and management controller module affects accessing, obtaining, creating, trading, managing, and the provision of optimal hedge portfolios, and/or the like across various communications networks.

The hedge portfolio generation and management controller module enabling access of information between nodes may be developed by employing standard development tools such as, but not limited to: (ANSI) (Objective-) C (++), Apache modules, binary executables, database adapters, Java, JavaScript, mapping tools, procedural and object oriented development tools, PERL, Python, shell scripts, SQL commands, web application server extensions, WebObjects, and/or the like. The hedge portfolio generation and management controller module may communicate to and/or with other modules in a module collection, including itself, and/or facilities of the like. Most frequently, the hedge portfolio generation and management controller module communicates with investors, markets, administrators, operating systems, other program modules, and/or the like. The hedge portfolio generation and management controller module may contain, communicate, generate, obtain, and/or provide program module, system, user, and/or data communications, requests, and/or responses.

Distributed Hedge Portfolio Generation and Management Controller

Module

The structure and/or operation of any of the hedge portfolio generation and management controller components may be combined, consolidated, and/or distributed in any number of ways to facilitate development and/or deployment. Similarly, the module collection may be combined in any number of ways to facilitate deployment and/or development. To accomplish this, one may integrate the components into a common code base or in a facility that can dynamically load the components on demand in an integrated fashion.

The module collection may be consolidated and/or distributed in countless variations through standard data processing and/or development techniques. Multiple instances of any one of the program modules in the program module collection may be instantiated on a single node, and/or across numerous nodes to improve performance through load-balancing and/or data-processing techniques. Furthermore, single instances may also be distributed across multiple controllers and/or storage devices; e.g., databases. All program module instances and controllers working in concert may do so through standard data processing communication techniques.

The configuration of the hedge portfolio generation and management controller will depend on the context of system deployment. Factors such as, but not limited to, the budget, capacity, location, and/or use of the underlying hardware resources may affect deployment requirements and configuration. Regardless of if the configuration results in more consolidated and/or integrated program modules, results in a more distributed series of program modules, and/or results in some combination between a consolidated and distributed configuration, data may be communicated, obtained, and/or provided. Instances of modules consolidated into a common code base from the program module collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If module collection components are discrete, separate, and/or external to one another, then communicating, obtaining, and/or providing data with and/or to other module components may be accomplished through inter-application data processing communication techniques such as, but not limited to: Application Program Interfaces (API) information passage; (distributed), Component Object Model ((D)COM), (Distributed) Object Linking and Embedding ((D)OLE), and/or the like), Common Object Request Broker Architecture (CORBA), process pipes, shared files, and/or the like. Messages sent between discrete module components for inter-application communication or within memory spaces of a singular module for intra-application communication may be facilitated through the creation and parsing of a grammar. A grammar may be developed by using standard development tools such as lex, yacc, XML, and/or the like, which allow for grammar generation and parsing functionality, which in turn may form the basis of communication messages within and between modules. Again, the configuration will depend upon the context of system deployment.

The entirety of this disclosure (including the Cover Page, Title, Headings, Field, Background, Summary, Brief Description of the Drawings, Detailed Description, Claims, Abstract, Figures, and otherwise) shows by way of illustration various embodiments in which the claimed inventions may be practiced. The advantages and features of the disclosure are of a representative sample of embodiments only, and are not exhaustive and/or exclusive. They are presented only to assist in understanding and teach the claimed principles. It should be understood that they are not representative of all claimed inventions. As such, certain aspects of the disclosure have not been discussed herein. That alternate embodiments may not have been presented for a specific portion of the invention or that further undescribed alternate embodiments may be available for a portion is not to be considered a disclaimer of those alternate embodiments. It will be appreciated that many of those undescribed embodiments incorporate the same principles of the invention and others are equivalent. Thus, it is to be understood that other embodiments may be utilized and functional, logical, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program modules (a module collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the invention, and inapplicable to others. In addition, the disclosure includes other inventions not presently claimed. Applicant reserves all rights in those presently unclaimed inventions including the right to claim such inventions, file additional applications, continuations, continuations in part, divisions, and/or the like thereof. As such, it should be understood that advantages, embodiments, examples, functional, features, logical, organizational, structural, topological, and/or other aspects of the disclosure are not to be considered limitations on the disclosure as defined by the claims or limitations on equivalents to the claims.

What is claimed is:

1. A processor implemented method for providing an optimal hedge portfolio comprising:

receiving an optimal hedge portfolio creation request;

identifying a relevant investing sector and/or investing style;

receiving a requested level of transactional costs determined by the formula $$\beta_1 + \beta_2\sigma + \beta_3 D + \frac{\beta_4}{\beta_5}\left[\left(\frac{S}{V^\gamma}\right)^{\beta_5} - 1\right];$$

deriving via a processor a selection of securities associated with the identified investing sector and/or investing style representing the maximum achievable effective n for the requested level of transactional costs;

receiving an investment portfolio;

comparing the investment portfolio to the derived selection of securities to determine a hedge ratio; and processing transactions to determine a hedge portfolio comprising the derived selection of securities according to the hedge ratio.

2. The method of claim 1 wherein the optimal hedge ratio is determined by performing a regression between the investment portfolio and the hedge portfolio.

3. The method of claim 2 wherein the regression is an orthogonal regression.

4. The method of claim 1 wherein the selection of securities is derived through iteratively processing each permeation of portfolio combinations having the requested level of transaction costs and computing each portfolio combination's effective n to find the maximum.

5. The method of claim 1 wherein the selection of securities is derived using a hill climbing algorithm.

6. The method of claim 1 wherein the selection of securities is derived by iteratively modifying and testing portfolio combinations until a maxim effective n is found.

7. The method of claim 1 wherein the derivation of the selection of securities is limited the maximum effective n for the requested level of transactional costs that can be determined using a pre-set amount of time.

8. The method of claim 1 wherein the derivation of the selection of securities is limited the maximum effective n for the requested level of transactional costs that can be determined using a pre-set number of iterations.

9. The method of claim 1 further comprising excluding securities with high transactional costs from the process of deriving the selection of securities.

10. The method of claim 1 wherein the derivation of the selection of securities comprises starting with a given portfolio and removing securities with weights greater than $$\left(\frac{2}{\bar{n}+1}\right).$$

11. The method of claim 1 wherein the derivation of the selection of securities comprises starting with a portfolio of securities held by a capital weighted index; calculating the transaction costs associated with acquiring the capital weighted index portfolio; and then iteratively modifying the capital weighted index portfolio to increase the effective n while maintaining a constant transaction cost.

12. A processor implemented method for determining an optimal hedge portfolio comprising:

receiving an investment portfolio to be hedged;

characterizing the investment portfolio's relevant sector and/or relevant investing style;

deriving via a processor a hedge portfolio made up of a collection of securities having a maximum effective n for a given amount of transaction costs determined by the formula $$\beta_1 + \beta_2\sigma + \beta_3 D + \frac{\beta_4}{\beta_5}\left[\left(\frac{S}{V^\gamma}\right)^{\beta_5} - 1\right];$$

comparing the hedge portfolio to the investment portfolio to determine a hedge ratio.

13. The method of claim 12 wherein the optimal hedge ratio is determined by performing a regression between the investment portfolio and the hedge portfolio.

14. The method of claim 13 wherein the regression is an orthogonal regression.

15. The method of claim 12 wherein the selection of securities is derived through iteratively processing each permeation of portfolio combinations having the requested level of transaction costs and computing each portfolio combination's effective n to find the maximum.

16. The method of claim 12 wherein the selection of securities is derived using a hill climbing algorithm.

17. The method of claim 12 wherein the selection of securities is derived by iteratively modifying and testing portfolio combinations until a maxim effective n is found.

18. The method of claim 12 wherein the derivation of the selection of securities is limited the maximum effective n for the requested level of transactional costs that can be determined using a pre-set amount of time.

19. The method of claim 12 wherein the derivation of the selection of securities is limited the maximum effective n for the requested level of transactional costs that can be determined using a pre-set number of iterations.

20. The method of claim 12 further comprising excluding securities with high transactional costs from the process of deriving the selection of securities.

21. The method of claim 12 wherein the derivation of the selection of securities comprises starting with a given portfolio and removing securities with weights greater than $$\left(\frac{2}{\bar{n}+1}\right).$$

22. The method of claim 12 wherein the derivation of the selection of securities comprises starting with a portfolio of securities held by a capital weighted index; calculating the transaction costs associated with acquiring the capital weighted index portfolio; and then iteratively modifying the capital weighted index portfolio to increase the effective n while maintaining a constant transaction cost.

23. A processor implemented method for determining an optimal hedge portfolio comprising:

receiving an investment portfolio to be hedged;

characterizing the investment portfolio's relevant sector and/or relevant investing style;

deriving via a processor a hedge portfolio made up of a collection of hedge securities and having a maximum effective n for a given amount of transaction costs determined by the formula $$\beta_1 + \beta_2\sigma + \beta_3 D + \frac{\beta_4}{\beta_5}\left[\left(\frac{S}{V^\gamma}\right)^{\beta_5} - 1\right],$$

wherein the hedge portfolio is determined by starting with a test hedge portfolio made up of the securities in a capital weighted index and matched to hedge the investment portfolio's relevant sector and/or relevant investing style and iteratively modifying the securities in the test hedge portfolio index using a hill climbing algorithm until a maximum effective n for the given costs is reached; and determining a hedge ratio using an orthogonal regression between the hedge portfolio and the investment portfolio.

24. A system for providing an optimal hedge portfolio comprising:

a memory;

a processor disposed in communication with said memory, and configured to issue a plurality of processing instructions stored in the memory, wherein the processor issues instructions to:

receive an optimal hedge portfolio creation request;

identify a relevant investing sector and/or investing style;

receive a requested level of transactional costs determined by the formula $$\beta_1 + \beta_2\sigma + \beta_3 D + \frac{\beta_4}{\beta_5}\left[\left(\frac{S}{V^\gamma}\right)^{\beta_5} - 1\right];$$

and derive a selection of securities associated with the identified investing sector and/or investing style representing the maximum achievable effective n for the requested level of transactional costs;

receive an investment portfolio;

compare the investment portfolio to the derived selection of securities to determine a hedge ratio; and acquire a hedge portfolio comprising the derived selection of securities according to the amounts defined by the hedge ratio.

25. A system for determining an optimal hedge portfolio comprising:

a memory;

a processor disposed in communication with said memory, and configured to issue a plurality of processing instructions stored in the memory, wherein the processor issues instructions to:

receive an investment portfolio to be hedged;

characterize the investment portfolio's relevant sector and/or relevant investing style;

derive a hedge portfolio made up of a collection of securities having a maximum effective n for a given amount of transaction costs determined by the formula $$\beta_1 + \beta_2\sigma + \beta_3 D + \frac{\beta_4}{\beta_5}\left[\left(\frac{S}{V^\gamma}\right)^{\beta_5} - 1\right];$$

and compare the hedge portfolio to the investment portfolio to determine a hedge ratio.

* * * * *